H. T. NAKAMIZO.
SELF HEATING CONTAINER.
APPLICATION FILED APR. 8, 1918.
1,309,418. Patented July 8, 1919.
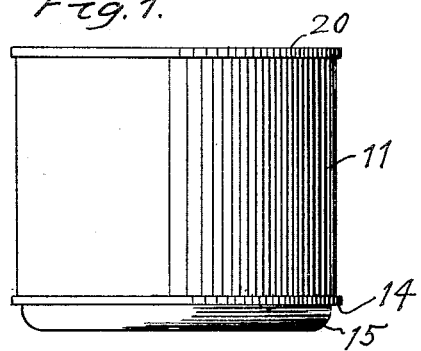
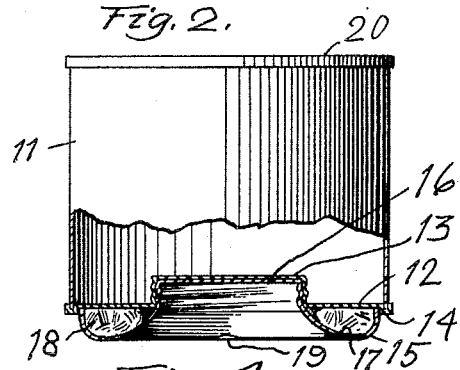
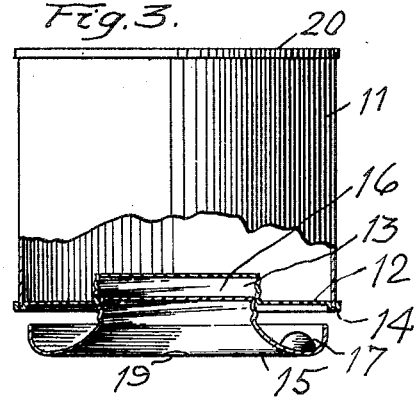
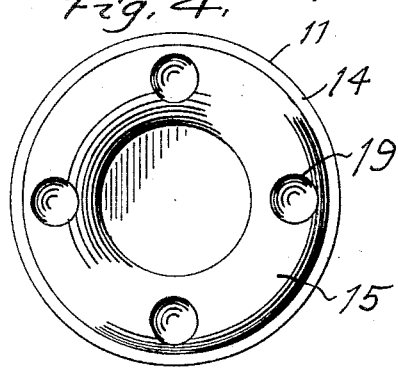
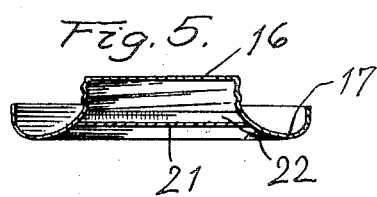
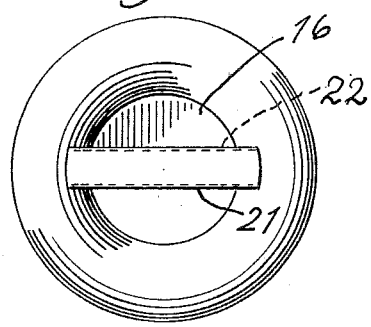
INVENTOR:
Hirotsune T. Nakamizo
By His Atty.
Edward M. Kojima

UNITED STATES PATENT OFFICE.

HIROTSUNE T. NAKAMIZO, OF LOS ANGELES, CALIFORNIA.

SELF-HEATING CONTAINER.

1,309,418.  Specification of Letters Patent.  Patented July 8, 1919.

Application filed April 8, 1918. Serial No. 227,242.

*To all whom it may concern:*

Be it known that I, HIROTSUNE T. NAKAMIZO, a subject of the Emperor of Japan, residing at Los Angeles, in the county of Los Angeles and State of California, have invented new and useful Improvements in Self-Heating Containers, of which the following is a specification.

This invention has relation to a container or can, and self-contained heating means therefor.

The object of the present invention is to provide a hermetic receptacle adapted to contain food ingredients and materials, and to provide self-contained means for heating the contents of the receptacle before removal or serving.

Another object is to provide simple and efficient heating means that may be readily manipulated for use, and that will be inexpensive to manufacture.

A practical embodiment of the invention is shown in the accompanying drawings, in which:

Figure 1 is a side elevation of the can or container before placing the heating means in an operative position. Fig. 2 is a side elevation of the can with the bottom part in section. Fig. 3 is a similar view, showing the heating means placed in position for heating the can. Fig. 4 is a bottom plan view of the can. Fig. 5 is a mid-sectional view of a modified form of heating means, Fig. 6 is a bottom plan view of the modified form of heating means.

Referring to the drawings, my improved self-heating container consists of a can 11, which is preferably a hermetic receptacle having the bottom 12, is provided with a threaded recess 13, concentric with the depending annular flange 14, on the bottom of the can. Secured to the bottom of the can is a cup member 15, having a concentric portion 16, threaded to correspond with the threaded recess 13, and having screw connection therewith. Member 15 is formed with an annular channel 17, containing a wick 18. Sockets 19 are provided in member 15, so that the same may be partly unscrewed and an annular opening formed between member 15 and the bottom of the can, as shown in Fig. 3.

In use, the can top 20, may be removed by a can opener or other suitable means. The cup member is then unscrewed so that a narrow annular opening is formed between the outer flange of the cup member, and the depending flange 14. The wick is then saturated with a combustible material such as alcohol or gasolene. A match is then applied and the wick is ignited.

In the form shown in Figs. 5 and 6, the cup member is provided with a transverse bar 21 having angular flanges 22, which serves as a means for unscrewing the cup member from the can. In this form of cup member, the inflammable material, such as a saturated wick or solidified alcohol, may be hermetically sealed, thus protecting the same from deterioration and evaporation, until the cup is partly unscrewed and ready for use.

From the foregoing it may be seen that I have provided a container having simple and efficient self-contained heating means that may be quickly placed in position for ignition for the purpose of thoroughly warming the contents before removal.

It is to be understood that various changes, alterations, and modifications may be made within the scope of the appended claims, and that the invention is not limited to the precise construction exhibited herein.

What is claimed is:

1. The combination with a container having a threaded recess in the bottom thereof, of a cup member having a correspondingly threaded portion in engagement with the threaded recess, an annular flange around the threaded portion of the cup, and a combustible material contained in the annular channel formed by the annular flange.

2. The combination with a container having an annular concentric and threaded recess in the bottom thereof, of a cup member having a correspondingly threaded portion in engagement with the recess, an annular flange on the cup member determining an annular channel, and a wick element emplaced in the annular channel.

3. The combination with a container having an annular and concentric recess in the bottom thereof, a cup receptacle having a correspondingly threaded portion in engagement with the concentric recess, an annular turned up flange on the cup member determining an annular channel adapted to contain a combustible material, and means for manually unscrewing the cup member sufficiently to form an annular opening between the upturned flange and the bottom of the container.

4. Hermetically sealed container means, a bottom end therefor, a threaded struck up and concentric portion on the bottom, a threaded cup member attached to said concentric portion, an annular flange on the cup member determining an annular channel, combustible means within the annular channel, and means whereby the cup member may be manually unscrewed to place the combustible means in active position.

5. Hermetically sealed container means having a central threaded bottom portion, a receptacle having screw connection with the threaded bottom portion, said receptacle being hermetically sealed, combustible elements in the receptacle, and a transverse bar in the bottom of the receptacle whereby the receptacle may be manually unscrewed a sufficient distance to place the combustible elements in unsealed and active position.

In testimony whereof, I hereunto affix my signature this 26th day of March, in the year 1918.

HIROTSUNE T. NAKAMIZO.

Witnesses:
FREDERIC M. KEENEY,
J. W. MASTER.

Copies of this patent may be obtained for five cents each, by addressing the "Commissioner of Patents, Washington, D. C."